United States Patent [19]
Stahl

[11] Patent Number: 5,817,393
[45] Date of Patent: *Oct. 6, 1998

[54] PRE-SEWN EMBLEM AND METHOD

[75] Inventor: Ted A. Stahl, Harrison Township, Mich.

[73] Assignee: Stahls' Inc., St. Clair Shores, Mich.

[ * ] Notice: The term of this patent shall not extend beyond the expiration date of Pat. No. 5,149,388.

[21] Appl. No.: 595,666

[22] Filed: Feb. 2, 1996

[51] Int. Cl.$^6$ .................................................... B32B 9/00
[52] U.S. Cl. ........................... 428/104; 428/102; 428/174; 428/187; 428/197; 428/289; 428/906.6; 156/250; 156/256; 156/258; 112/439
[58] Field of Search ..................... 428/289, 189, 428/196, 200, 201, 104, 187, 197, 906.6, 81, 102, 174, 480; 156/250, 257, 268, 263, 258; 2/244, 246; 112/439

[56] References Cited

U.S. PATENT DOCUMENTS

| | | |
|---|---|---|
| 3,657,060 | 4/1972 | Haigh . |
| 3,816,211 | 6/1974 | Haigh ........................................ 156/309 |
| 4,140,563 | 2/1979 | Sernaker . |
| 4,404,249 | 9/1983 | Margerum et al. . |
| 4,517,910 | 5/1985 | Jalowsky ................................... 112/439 |
| 4,581,278 | 4/1986 | Margerum et al. . |
| 5,009,943 | 4/1991 | Stahl ........................................ 428/40 |
| 5,143,672 | 9/1992 | Kuwahara . |
| 5,149,388 | 9/1992 | Stahl ........................................ 156/250 |
| 5,298,031 | 3/1994 | Gabay et al. . |
| 5,322,583 | 6/1994 | Wharton . |
| 5,411,783 | 5/1995 | Mahn, Jr. . |
| 5,422,173 | 6/1995 | Stahl . |

Primary Examiner—Patrick Ryan
Assistant Examiner—Abraham Bahta
Attorney, Agent, or Firm—Brooks & Kushman P.C.

[57] ABSTRACT

A simplified assembly for a multi-colored emblem that includes a non-woven base layer which outlines the emblem. The non-woven base layer extends beyond the embroidered fabric layer and provides an emblem with a non-fraying border.

10 Claims, 1 Drawing Sheet

PRE-SEWN EMBLEM AND METHOD

FIELD OF INVENTION

The present invention relates to a simplified assembly for a multi-layered emblem that is pre-sewn to provide the appearance of being directly embroidered on an underlying substrate, such as a garment. This assembly for a multi-layered emblem has a non-woven base layer which extends around and beyond the periphery of the edge-embroidered fabric layer to provide a non-fraying border which prevents any fraying or raveling of the embroider stitching.

BACKGROUND ART

Emblems have been widely used as a tool for the application of pre-designed markings such as logos, patches, numbers, letters and the like. In certain applications, these emblems serve as identifiers. In the case of emblems for sports jerseys or other sports related paraphernalia, emblems, in particular, number and letter emblems, function as team and player identifiers. Emblems are also frequently used as geographic indicators for souvenir merchandise. Yet, in other cases, the emblem is simply an element of design for a garment or accessory.

Embroidered emblems have become increasingly popular. Emblems such as letters and numbers with embroidered edges have been utilized on sporting uniforms, jackets and other sports related garments for many years. The emblems are embroidered with a design, which may be a trademark, a name, or any arbitrary design. However, embroidering an emblem directly onto a substrate is a very time-consuming and labor-intensive process. An alternate technique of pre-sewn embroidery is disclosed in Stahl's U.S. Pat. No. 5,422,173 for a "Pre-Sewn Letter and Method". In Stahl's '173 patent, the disclosure of which is incorporated herein, the multi-colored, pre-sewn letter includes an upper fabric layer cut to a specific configuration, and embroidered around the periphery, and a lower fabric layer of a different color than the upper fabric layer and cut to a complementary larger size,. The lower fabric layer is also embroidered around the periphery. The two layers when heat-sealed produce a multi-colored pre-sewn emblem. This technique results in an emblem that closely duplicates an embroidered garment. The embroidery thread generally appears on the edge of both the upper fabric layer and the lower fabric layer, so that the embroidery gives the resemblance of being directly sewn onto the underlying substrate and prevents fraying of each of the fabric layers. However, there are problems associated with having a multi-colored emblem with embroidery stitching. To produce such a pre-sewn emblem requires embroidery stitching of both the upper and lower fabric layers. Having to embroider stitch both fabric layers increases the cost and production time for the emblems.

The many steps outlined above could be avoided if an emblem assembly was designed to achieve a multi-colored embroidered appearance without the need for two fabric layers each having embroidered peripheries. This would further substantially reduce the cost of manufacturing these emblems and simultaneously therewith completely eliminate the need for embroidering around the periphery of each of two fabric layers.

Additionally, prior art emblem assemblies often have limited applicability, and cannot be adhered to a host of materials. For such prior art emblems, only those materials which allow an adhesive to penetrate therethrough can be utilized. For example, U.S. Pat. No. 3,816,211 discloses a method for making an embroidered emblem which has a fabric base with an embroidered design on the base and a thermoplastic material laminated to the base. The emblem is fastenable to a garment by conventional heat-sealing. However, this emblem assembly is not heat-sealable to many synthetic materials. Accordingly, such technology cannot be used to apply an emblem onto most modern synthetic materials.

In the sports industry, where a number of embroidered emblems are used, synthetic materials are common. The garment industry designs sports clothing keeping in mind the requirements of an athlete, such that the fabric is durable, comfortable and often times water repellent. Given these requirements, athletic jerseys are often constructed from fabrics such as siliconized nylon, Gortex, polypropylene, tri-acetate and Lycra. The nature of these fabrics makes it very difficult for any adhesive to penetrate the fabric, thereby such materials traditionally do not form good substrates on which to adhere emblems.

DISCLOSURE OF INVENTION

An object of the present invention is to provide an emblem that is easily assembled, with a minimum of materials and production time required to provide an emblem which, when applied onto a garment, provides an embroidered appearance.

Another object of the present invention is the simplification of the emblem assembly. Pursuant to this object a multi-colored, non-fraying embroidered emblem can be achieved without requiring multiple embroidery steps.

An additional object of the present invention is to provide a method for producing an emblem having an embroidered appearance which is easily applied to fabrics that are generally difficult surfaces on which to adhere.

In carrying out the above objects of the invention, the method for producing a pre-embroidered emblem for heat-sealing to a fabric substrate in accordance with the invention comprises the steps of providing a non-woven base layer, providing a fabric layer, cutting the fabric layer to the configuration of the emblem to be produced and cutting the base layer to a same but larger configuration than the fabric layer, such that when the fabric layer is placed on top of the base layer, the base layer outlines the emblem and is exposed around the periphery of the fabric layer; coating one side of the fabric layer with an adhesive; coating one side of the base layer with a heat-sensitive adhesive; assembling the emblem by placing the adhesive coated side of the fabric layer in mating contact with the base layer, wherein the base layer is exposed continuously around the periphery of the fabric and the heat-sensitive adhesive is exposed for heat-sealing against the fabric substrate; and embroider stitching about the periphery of the fabric layer and extending through the base layer to produce a pre-sewn emblem with a base layer outlining the emblem and free from embroidery.

The heat-sensitive adhesive has a lower melting temperature than the base layer such that the heat-sensitive adhesive will become activated and adhere the emblem to the underlying substrate, without the thermoplastic base layer reaching its melting point. The exposed portion of the non-woven base layer which outlines the emblem provides a way to form a pre-embroidered emblem without the need to embroider around the periphery of the base layer to prevent it from fraying. Since the base layer is itself non-woven, the base layer will not fray or ravel. When placed on the underlying substrate, the emblem also moves with the fabric in a unitary fashion without bunching or distorting the substrate. Furthermore, the emblem disclosed in the present invention, results in an emblem which when attached to a garment, creates an embroidered appearance.

In a preferred embodiment of the invention, the fabric layer consists of a woven material such as twill, polyester, cotton or felt. The non-woven base layer is preferably a thermoplastic material such as PVC, AVA, urethane, polyester, or nylon. The base layer further has a higher melting point than the heat-sensitive adhesive to prevent the heat-sensitive adhesive from penetrating through the base layer and staining the fabric layer.

The above objects, features and advantages of the present invention are readily apparent from the following detailed description of the best mode for carrying out the invention when taken in connection with the accompanying drawings.

BEST MODE FOR CARRYING OUT THE INVENTION

Figure 1:
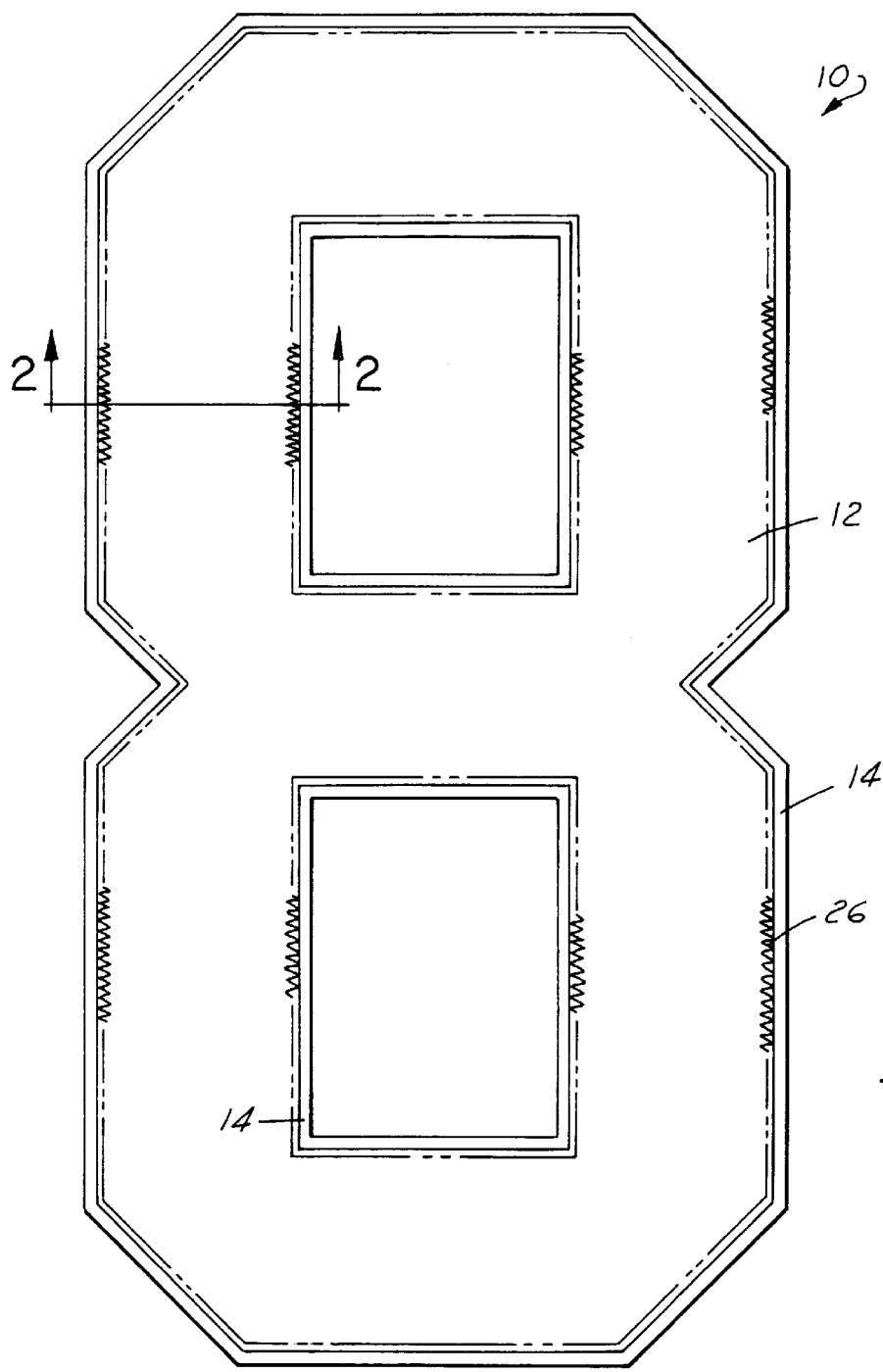
FIG. 1 is a front view of an embroidered emblem produced according to the present invention.

Referring to FIG. 1 of the drawings, there is shown an embroidered emblem produced in accordance with the present invention, consisting of the number 8 and generally indicated by reference number 10. As is shown and more fully described, the embroidered emblem 10 depicts a simplified emblem assembly which results in a non-fraying emblem that is easy to produce, time- and cost-effective. This emblem assembly further eliminates the need for directly sewing letters and logos onto hard-to-adhere fabrics such as siliconized nylon, Gortex, polypropylene, tri-acetate and Lycra.

Figure 2:
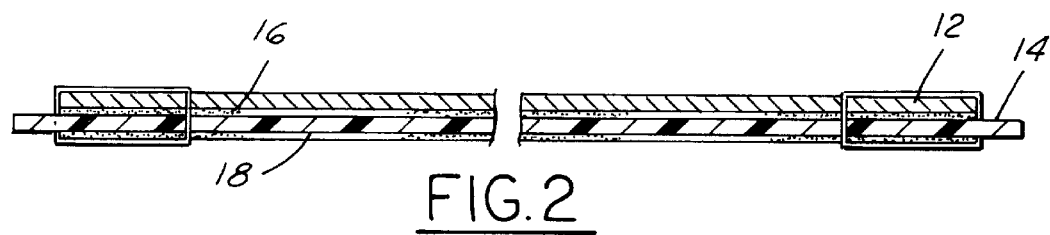
FIG. 2 is an cross-sectional view taken on the line 2—2 of FIG. 1 of the embroidered emblem shown in FIG. 1.

As shown in FIG. 2, the embroidered emblem 10 includes a fabric layer 12, a non-woven base layer 14, an adhesive coating 16 sandwiched between the fabric layer 12 and the base layer 14, and a heat-sensitive adhesive 18 coating the base layer 14, so that the heat-sensitive 18 coating is exposed for attachment of the emblem 10 to an underlying substrate. As seen in FIGS. 1 and 2, the fabric layer 12 and base layer 14 are the same shapes yet of different relative sizes, so that the base layer 14 is exposed continuously around the periphery of the fabric layer 12. In one embodiment, the fabric and base layers 12, 14 are contrasting colors to create a multi-colored emblem.

The present invention contemplates a base layer 14 and a fabric layer 12, wherein the base layer 14 is sized to at least cover the fabric layer 12. Accordingly, both layers are generally coextensive. In the preferred pre-sewn embodiment the base layer 14 and fabric layer 12 are precut to roughly produce a base layer 14 outlining the superposed fabric layer 12. In this embodiment, the peripheral edge of the base layer 14 defines the extremities of the emblem 10. Upon termination, the heat-sensitive adhesive coating 18 is the only layer of the emblem which comes into direct contact with the underlying substrate. In another emblem embodiment, the larger sized base layer 14 may be cut to any desired contour, such as a jagged edge design, scalloped contour, and the like. Accordingly, the peripheral exposed edge of the base layer 14 may be of any desired contour.

After the step of assembling, the emblem is sewn, as illustrated in FIG. 1, with a thread about the peripheral edge of the fabric layer 12 to produce a pre-sewn emblem having an embroidered appearance.

In the present embodiment, the base layer 14 can be formed from any material. The base layer is preferably a thermoplastic material such as polyurethane, polyamide, polyester or blends thereof. The fabric layer 12 and the base layer 14 may be laminated together with conventional heat-sealing techniques wherein the adhesive coating 16 between the two layers is melted and pressure is applied in such a way to cause both layers to stick together.

The adhesive coating 16 between the fabric layer 12 and the base layer 14 is preferably a thermoplastic adhesive. However, a pressure sensitive adhesive is also suitable. Suitable thermoplastic adhesives are polyamide, polyester, PVC and polyurethane adhesives. Suitable pressure sensitive adhesives include acrylics, silicone resins, polyurethane dispersions, EVA and rubber-solvent blends. The adhesive coating 16 preferably has a melting point generally between 280° and 350° F.

To effect a heat seal between the base layer and the underlying substrate, conventional heat-sealing machines are also suitable. The platens of a heat-sealing machine sandwich the pre-embroidered emblem 10 to cause the heat-sensitive adhesive coating to affix to the underlying substrate. The upper platen is reciprocated in a downward direction so as to drive the upper and lower die faces together in the operative association. The upper and lower die faces when brought into operative association sandwich the emblem assembly and the underlying substrate and effectuate heat sealing thereon.

The heat-sensitive adhesive 18 is preferably a thermosettable film of a linear saturated polyester polymer which includes a heat-activated curing agent. The end cured polyester itself is a linear alkyl unsaturated polyester formed by reacting a glycol with a diacid. The molecular weight of the uncured polyester polymer must be low enough to flow and wet the surface of the base layer 14 at application temperature, i.e., generally about less than 450° F. Specifically suitable diols include ethylene glycol, propylene glycol, 1,3-propane diol, 1,4-butane diol, 1,5-pentane diol, 1,6-hexane diol, 1,8-octane diol, 1,4-cyclohexanedimethanol, 1,3-cyclohexanedimethanol, diethylene glycol and the like.

The heat-activated curing agent must act to cure the polyester upon heating. The use of a heat-activated curing agent is preferable as these embroidered emblems require a shelf life of several months. The heat-activated curing agent can be an isocyanate curing agent preferably a blocked isocyanate curing agent.

A preferred heat-sensitive adhesive for use in the present invention is Bostick™ adhesive 10-300-3 which is a thermosetting linear saturated polyester adhesive using an isocyanate curing agent and a polyester formed from ethylene glycol and methylterphthalic acid.

The heat-sensitive adhesive coating 18 will allow the emblem 10 to be applied to substrates which are traditionally difficult to adhere to, such as nylon. At the same time, the emblem 10 is being applied to such a substrate, the higher melting temperature of the thermoplastic base layer 14 acts as a physical and thermal barrier and prevents the heat-sensitive adhesive coating 18 from entering the fabric layer 12 of the emblem 10 which would thereby discolor, deface or cause the emblem 10 to itself absorb the adhesive.

The emblem 10 may be supported and stored for ease of handling on a strip formed by a carrier sheet prior to attachment of the emblem on a substrate. The carrier sheet should be releasable and made of paper, fabric or plastic.

While the best mode for carrying out the invention has been described in detail, those familiar with the art to which this invention relates will recognize various alternative designs and embodiments for practicing the invention as defined by the following claims.

What is claimed is:

1. A method for producing a pre-embroidered emblem for heat-sealing to a substrate, comprising:

providing a non-woven base layer;

providing a fabric layer;

cutting said fabric layer to the configuration of the emblem to be produced;

cutting said base layer to a same but larger configuration than said fabric layer, such that when said fabric layer is juxtaposed on said base layer, said base layer outlines said fabric layer and is exposed around the periphery of said fabric layer;

coating one side of said fabric layer with an adhesive;

coating one side of said base layer with a heat-sensitive adhesive;

assembling the emblem by placing said adhesive coated side of said fabric layer in registry with said base layer, wherein said base layer is exposed continuously around the periphery of said fabric layer and said heat sensitive adhesive coating is exposed for heat-sealing with the fabric substrate; and embroider stitching about the periphery of said fabric layer and extending through said base layer, such that said exposed portion of said base layer is free from embroider stitching.

2. The method of claim 1 wherein said fabric layer is of a color contrasting the color of said base layer to provide a multi-colored emblem.

3. A method of claim 1 wherein said fabric layer is selected from the group consisting of twill, polyester, cotton and felt.

4. A method of claim 1 wherein said non-woven base layer is a thermoplastic material selected from the group consisting of PVC, AVA, urethane, polyester and nylon.

5. A method of claim 1 wherein said base layer has a melting point higher than the melting point of said heat-sensitive adhesive.

6. The method of claim 1 wherein said heat-sensitive adhesive is a polyester with a heat-activated curing agent.

7. The method of claim 1 wherein said adhesive coating on said fabric layer is a thermoplastic adhesive.

8. The method of claim 1 wherein a carrier sheet is placed on said heat-sensitive adhesive coating for storing and transportation.

9. A pre-embroidered emblem for heat-sealing to a substrate, comprising:

a fabric layer cut to a configuration of the desired emblem;

a non-woven base layer cut to a same but larger configuration than said fabric layer, such that when said fabric layer is juxtaposed on said base layer, said base layer outlines said fabric layer and is exposed around the periphery of said fabric layer;

a heat-sensitive adhesive coating one side of said base layer;

an adhesive coating on one side of said fabric layer;

said emblem being assembled by placing said fabric layer in registry with said base layer, wherein said base layer is exposed continuously around the periphery of said fabric layer and where said heat sensitive adhesive coating is exposed for heat-sealing with the fabric substrate; and said fabric layer having embroidery around the periphery of said fabric layer and extending through said base layer, such that said exposed portion of said base layer is free from embroidery.

10. A method for producing a multi-colored, pre-embroidered emblem for heat-sealing onto a fabric substrate, comprising:

providing a non-woven base layer;

providing a fabric layer of a color contrasting that of said base layer;

cutting said fabric layer to the configuration of the emblem to be produced;

cutting said fabric layer to the configuration of the emblem to be produced;

cutting said base layer to a same but larger configuration than said fabric layer, such that when said fabric layer is juxtaposed on said base layer, said base layer outlines said fabric layer and is exposed around the periphery of said fabric layer;

coating one side of said fabric layer with an adhesive;

coating one side of said base layer with a heat-sensitive adhesive;

assembling the emblem by placing said adhesive coated side of said fabric layer in registry with said base layer, wherein said base layer is exposed continuously around the periphery of said fabric layer and said heat sensitive adhesive coating is exposed for heat-sealing with the fabric substrate; and embroider stitching about the periphery of said fabric layer and extending through said base layer, such that said exposed portion of said base layer is free from embroidered stitching.

* * * * *